United States Patent [19]

Tadewald

[11] 4,207,129
[45] Jun. 10, 1980

[54] MANUFACTURE OF CONDUCTIVE OR SEMI-CONDUCTIVE ELEMENTS BY MEANS OF A CONTINUOUS PULTRUSION PROCESS

[75] Inventor: Thomas D. Tadewald, La Crosse, Wis.

[73] Assignee: UOP Inc., Des Plaines, Ill.

[21] Appl. No.: 27,430

[22] Filed: Apr. 5, 1979

Related U.S. Application Data

[63] Continuation-in-part of Ser. No. 853,061, Nov. 21, 1977, abandoned.

[51] Int. Cl.² ............................................. B29D 9/08
[52] U.S. Cl. ................................. 156/242; 156/243; 156/324; 219/213; 219/345
[58] Field of Search ............... 156/178, 179, 242, 243, 156/228, 298, 299, 300, 301, 302, 324; 219/213, 345, 543, 544, 546; 29/624, 625, 626, 627

[56] References Cited

U.S. PATENT DOCUMENTS

| | | | |
|---|---|---|---|
| 2,889,439 | 6/1959 | Musgrave | 219/345 |
| 3,031,739 | 5/1962 | Boggs | 219/345 |
| 3,380,867 | 4/1968 | Morey | 156/242 |
| 3,973,103 | 8/1976 | Tadewald | 219/345 |
| 4,032,751 | 6/1977 | Youtsey et al. | 219/345 |

*Primary Examiner*—Caleb Weston
*Attorney, Agent, or Firm*—James R. Hoatson, Jr.; Raymond H. Nelson; William H. Page, II

[57] ABSTRACT

Conductive or semi-conductive elements which may be utilized as heating elements are manufactured in a continuous process utilizing a method known as pultrusion. The elements are prepared by forming semi-cured sheets comprising a support containing a mixture of a conductive or semi-conductive powder and a resin. The semi-cured sheets are fitted with conductive buss bars to form a conductive or semi-conductive element which is thereafter encapsulated in a glass roving-resin mixture to form the desired element. This element is then pulled through a heated die to effect the desired physical shape and thereafter may be cut to the desired size.

12 Claims, 2 Drawing Figures

MANUFACTURE OF CONDUCTIVE OR SEMI-CONDUCTIVE ELEMENTS BY MEANS OF A CONTINUOUS PULTRUSION PROCESS

CROSS-REFERENCE TO RELATED APPLICATIONS

This application is a continuation-in-part of my copending application Ser. No. 853,061 filed Nov. 21, 1977 and now abandoned, all teachings of which are incorporated herein by reference thereto.

This invention relates to a method for forming conductive or semi-conductive elements. More specifically, the invention is concerned with a continuous pultrusion method for forming conductive or semi-conductive elements which may be utilized as heater elements.

Heater elements in which the temperature should be maintained within a relatively narrow range are useful in many applications. For example, a need exists in the agricultural industry for flooring in various buildings such as farrowing pens whereby the temperature is maintained at a desired level to prevent the piglets or farrows from coming in contact with cold surfaces and thus become susceptible to various diseases. In many types of heater or heating elements which are currently in use, the particular configuration of the heaters will prevent them from possessing an evenness of heat. However, in contradistinction to this, it has now been discovered that by forming a heater from a conductive or semi-conductive element of the type hereinbefore set forth in greater detail it is possible to manufacture a heating element which will allow a relatively narrow control or change of temperature by changing or controlling the resistance of the element. The heater element which is formed by the process of the present invention will possess a low watt density. By reason of having a low watt density, the heater element will require a lesser amount of current to operate, thereby lessening the amount of energy which is required to heat the element to the desired temperature. Another advantage which is found in the method of the present invention is that by forming the heating or conductive element in a continuous pultrusion type of operation, it is possible to cut the heater element to any size which is desired, thus forming an element which possesses a desirable surface area.

It is therefore an object of this invention to provide a process for manufacturing a conductive or semi-conductive element.

A further object of this invention is found in a method for the continuous pultrusion of a conductive or semi-conductive element whereby the element may be readily formed or manufactured in a desired size.

In one aspect an embodiment of this invention resides in a method for the continuous pultrusion of a shaped conductive or semi-conductive element which comprises the steps of admixing at least one conductive or semi-conductive powder possessing a conductivity at ambient temperature of from about $10^{-8}$ to about $10^2$ inverse ohm centimeters with a polymeric resin selected from the group consisting of thermoplastic resins and thermosetting resins; applying said admixture to a support material to form a sheet; placing conductive buss bars in juxtaposition between at least two of said sheets to form a conductive or semi-conductive element; subjecting said element to a B-stage cure at a temperature in the range of from about ambient to about 400° F. to effect the formation of a semi-cured element; reinforcing said element by adding thereto at least one layer of glass rovings; encapsulating the reinforced element by passing said element through a bath of encapsulating resin; pulling said encapsulated conductive or semi-conductive element through a heated die possessing a temperature gradient within said die of from about 100° to about 400° F. to effect the desired physical shape of said encapsulated conductive or semi-conductive element; and recovering said shaped encapsulated conductive or semi-conductive element.

A specific embodiment of this invention is found in a method for the continuous pultrusion of a conductive or semi-conductive element which comprises admixing a mixture of acetylene black and a high surface area inorganic oxide containing at least a monolayer of a pyropolymer on the surface thereof with a phenolic resin, applying the mixture to a highly absorbing paper, placing conductive buss bars in juxtaposition between the resultant sheets to form a conductive or semi-conductive element, subjecting the element to a B-stage cure at a temperature in the range of from about ambient to about 400° F., reinforcing the element by adding thereto at least one layer of glass rovings, encapsulating the reinforced element by passing the element through a bath of a polyester resin, pulling the encapsulated element through a heated die which possesses a temperature gradient change of from about 100° to about 400° F. and recovering the resultant encapsulated conductive element.

Other objects and embodiments will be found in the following further detailed description of the present invention.

As hereinbefore set forth the present invention is concerned with a method for manufacturing conductive or semi-conductive elements by means of a continuous pultrusion process. The advantages of using such a process have been hereinbefore set forth and include an ease of handling as well as the ability to control the resistance of the element. The conductive or semi-conductive elements which may be utilized as heaters are prepared in a continuous pultrusion method by admixing a conductive or semi-conductive powder with a polymeric resin of the type hereinafter set forth in greater detail which may be of the thermosetting or thermoplastic variety. The mixture of powder and resin is then applied to a support of the type hereinafter set forth in greater detail which is then subjected to a B-stage cure in order to form a semi-cured sheet of material. The impregnated support may be used to form a laminate in which the sheets are from at least 2 to about 10 ply in thickness. Conductive buss bars are fitted between two of the sheets of the laminate, and preferably on the edge thereof, although the exact positioning of the buss bar in relation to the thickness of the laminate may be varied without departing from the scope of this invention. Alternatively, the buss bars may be positioned between two layers of the support prior to treatment of the support with the mixture of conductive or semi-conductive powder and resin and the two sheets of support with the buss bars in between are then passed through a dip tank wherein they are impregnated with the aforesaid mixture. The resulting conductive or semi-conductive element is then passed through heated pressure squeeze rollers to remove excess resin-powder mixture and then passed to a heating oven to effect the B-stage cure. Following the cure, the element in non-encapsulated form is then subjected to a reinforcing step, if so desired, before being encapsulated by treatment with an encapsulating resin. After passage through the resin tank, the encapsulated element is thereafter passed through a heating die which may be of any form desired and continually pulled therethrough, said element being cured by passage through the die which may be of various configuration such as tubes, squares, rectangles, sheets, etc. After being formed into the desired shape by passage through the die, the element may then be cut into any desired length, shape or size and utilized as a heating element.

Examples of polymeric supports which may be either thermosetting or thermoplastic in nature, which may be employed in admixture with a conductive or semi-conductive powder of the type hereinafter set forth in greater detail will include thermosetting resins such as amino compounds including urea-formaldehyde, melamine-formaldehyde, aniline-formaldehyde, ethylene urea-formaldehyde, benzoquanamine-formaldehyde, phenol-formaldehyde, epoxy resin, etc., or thermoplastic polymers such as polyesters, polyethylene, polypropylene, polystyrene, polyvinylchloride, polyphenylene oxide, polysulfones, polyaryl ethers, polyaryl sulfones, polycarbonates, urethane, acrylates such as methyl methacrylate, methyl acrylate, acetyls, etc. The aforementioned polymeric substrates may be admixed with at least one conductive or semi-conductive powder or mixtures thereof, examples of these powders including activated carbon, acetylene black, or a high surface area inorganic oxide containing at least a monolayer of a carbonaceous pyropolymer containing recurring units of carbon and hydrogen on the surface thereof. An example of the latter powder would be a material comprising a refractory inorganic oxide having a surface area of from about 25 to about 500 m$^2$/g possessing at least a monolayer of a carbonaceous pyropolymer formed thereon, this semi-conducting material possessing a conductivity at room temperature of from about $10^{-8}$ to about $10^2$ inverse ohm centimeters. The material may be prepared by treating an inorganic oxide such as alumina, and particularly gamma-alumina, silica or silica-alumina, with a pyropolymer precursor at elevated temperatures ranging from about 400° to 1200° C. Examples of pyropolymer precursors which may be employed will include organic compounds such as aliphatic hydrocarbons, aliphatic halogen derivatives, aliphatic nitrogen derivatives, aliphatic sulfur derivatives, aliphatic nitrogen derivatives, aromatic hydrocarbons and derivatives thereof, heterocyclic compounds, cyclic hydrocarbons, organo metallic compounds, etc. Specific examples of organic pyrolyzable substances will include ethane, propane, butane, pentane, ethylene, propylene, 1-butylene, 1-pentene, ethyne, propyne, 1,3-butadiene, isoprene, chloromethane, bromoethane, 1-chloropropane, methylenedichloride, chloroform, carbon tetrachloride, methyl alcohol, ethyl alcohol, propyl alcohol, butyl alcohol, glycol, glycerol, ethyl ether, isopropyl ether, ethylene chlorohydrin, propylene chlorohydrin, ethylene oxide, propylene oxide, formaldehyde, acid aldehyde, propyl aldehyde, acetone, methyl ethyl ketone, diethyl ketone, ethyl propyl ketone, formic acid, acetic acid, acrylic acid, oxalic acid, chloroethanolic acid, methyl formate, ethyl formate, methyl acetate, ethyl acetate, methyl mercaptan, ethyl mercaptan, propyl mercaptan, methyl sulfide, ethyl sulfide, nitromethane, nitroethane, 1-nitropropane, acetamide, propionamide, dimethylamine, diethylamine, tripropylamine, methylethylamine, methylpropylamine, acetonitrile, propionitrile, benzene, toluene, the isomeric xylenes, napthalene, anthracene, benzylchloride, phenol, o-cresol, benzyl alcohol, hydroquanidine, resorcinol, anisole, phenetole, benzaldehyde, acetophenone, benzophenone, benzoic acid, phenyl acetic acid, benzene sulfonic acid, toluene sulfonic acid, nitrobenzene, aminobenzene, furan, pyran, etc. It is to be understood that the aforementioned organic pyrolyzable substances are only representative of the class of compounds which may be pyrolyzed to form the carbonaceous pyropolymer on the surface of the inorganic oxide support. In addition, it is also contemplated that the refractory inorganic oxide may be promoted or preimpregnated with a metallic substance such as platinum, palladium, nickel, tin, germanium, rhenium and mixtures thereof. The conductive powder or semi-conductive powder or mixtures thereof are admixed with the aforementioned thermosetting or thermoplastic resins in amounts in a range of from about 2% to about 10% by weight of the resin.

The mixture of the conductive powder or semi-conductive powder and the resin is utilized to treat a support which may comprise glass, woven fabrics, glass mats, paper, etc. In the event that the support comprises a paper, the type of paper which may be utilized would comprise a highly absorbing material such as cotton linter paper, Kraft paper, etc.; while the woven fabrics may include fabrics made from natural fibers such as cotton, linen, wool, or canvas, etc., or fabrics woven from synthetic fibers such as nylon, orlon, rayon, dacron, etc. The application of the resin-powder mixture to the support may be effected by any conventional treating method which is utilized in the laminating industry, a specific example being passage of the support through a dip tank. Following the treatment of the support, it is then subjected to a B-stage cure in which the treated support is placed in a semi-cured state by treatment with heat. The B-stage cure of the treated support is usually effected at elevated temperatures which may range from about 200° up to about 400° F. although it is also contemplated within the scope of this invention that when utilizing certain combinations of plastic compounds and supports it may be possible to effect the B-stage cure at ambient temperature.

In one embodiment of the invention the support of the type hereinbefore set forth may be formed into a laminate containing conductive or heating elements in the form of conductive buss bars which are inserted between two sheets of the support prior to said support being treated with the aforementioned resin-conductive or semi-conductive powder mixture. In the preferred embodiment of the invention the buss bars will comprise copper foil, although it is also contemplated within the scope of this invention that other conductive metals such as aluminum, nickel, tin, etc., may also be used. The buss bars are placed between the two sheets of the support in juxtaposition and at predetermined distances from one another. The area between the buss bars will be dependent upon the resistivity of the mixture consisting of resin and conductive or semi-conductive powders. Also in the preferred embodiment of the invention the thickness of the metal buss bars may range from about 0.001 to about 0.01", while the width and length of the buss bar may be of any probable ratio. By varying the parameters hereinbefore set forth, that is, the distance between the conductive buss bars, the width, length and thickness, it is possible to control the resistance of the element and thereby control the temperature to which the heating element is to be used. While the above discussion is illustrative of the placement of buss bars between two sheets of support to form a laminate, it is also contemplated that an additional number of sheets of support may also be applied to form a laminate of predetermined thickness, the number of sheets which form the laminate ranging from 2 to about 10 in number.

The thus formed conductive or semi-conductive element after passage through the B-stage cure may then, if so desired, be reinforced by having added thereto a reinforcing material which may comprise glass rovings, which are unidirectional glass fibers, or fabric such as scrim cloth, etc. After reinforcing the conductive or semi-conductive element, it is then passed through a resin tank which may contain encapsulating resins such as polyester resins, epoxy resins, etc., whereby the element is encapsulated within a coating of the aforementioned resins. After encapsulating, the element is continuously pulled through a heated die. This die which is utilized in the pultrusion process may be of any configuration so that the conductive or semi-conductive element is formed into the desired shape which may be of centrifugal, square, rectangle, etc., configuration. The heated die is maintained at an elevated temperature, the gradient change in the die ranging from about 100° to about 400° F., the lower end of said range being at that portion of the die to which the conductive or semi-conductive element is first admitted. As hereinbefore set forth the encapsulated element is continuously pulled through the die, emerging from the outlet end of said die in a cured stage and is thereafter cut by means such as a cut-off saw to the desired length and recovered.

BRIEF DESCRIPTION OF THE DRAWINGS

The present invention will be further illustrated with reference to the accompanying drawings which disclose a schematic flow sheet for the continuous pultrusion process of the present invention. It is to be understood that various inlet means, outlet means, motors, etc., have been eliminated as not being essential to the complete understanding of the invention. However, the utilization of these as well as other appurtenances will become obvious as the drawing is described.

Figure 1:
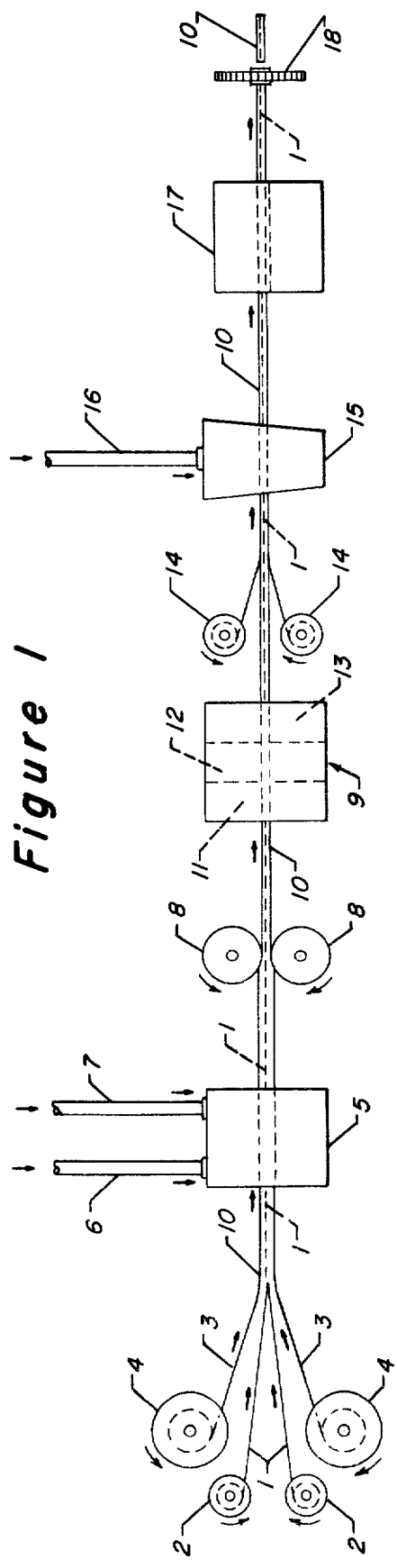
FIG. 1 of the drawing is a side view of the flow scheme.
Figure 2:
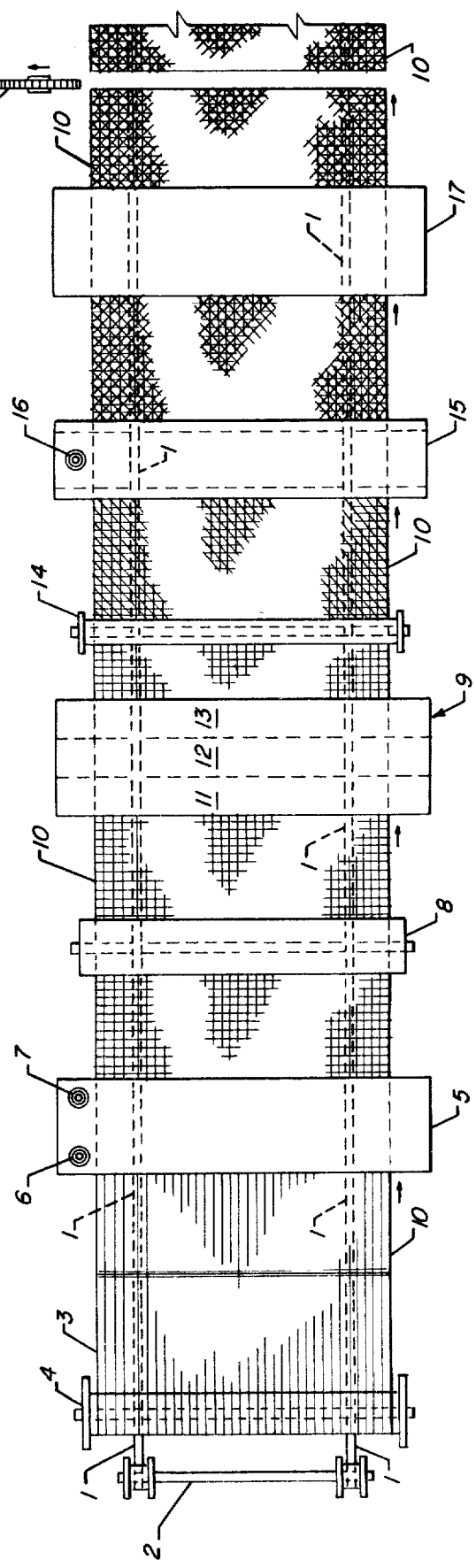
FIG. 2 is a top view of said flow scheme.

Turning now to the drawing, conductive buss bars 1 such as copper, nickel, etc., are continuously fed from rollers 2 to be incorporated between two sheets of support 3 which are also continuously fed from rolls 4 which are provided with said support, said support comprising glass, paper, fabric, etc. The supports are continuously fed by means of a belt mechanism, not shown in the drawing, to dip tank 5 which contains a mixture of a thermosetting or thermoplastic resin such as a phenolic, epoxy resin, polystyrene, etc., which is admixed with a conductive or semi-conductive powder, the resin and powder being charged to dip tank 5 through lines 6 and 7, respectively. After passage through dip tank 5 the treated support which is impregnated with the resin-powder mixture is withdrawn and passed through heated squeeze rollers 8 which remove any excess resin mixture prior to charging the element comprising the treated supports containing the buss bars to a heating zone or oven 9. In heating zone 9 the conductive element 10 is subjected to a B-stage cure by passage through oven 9. The temperature of oven 9 may be in a temperature gradient ranging from about 200° to about 400° F., the zones in said oven being 11, 12 and 13. After being subjected to the B-stage cure in oven 9, the element 10 is withdrawn and, if so desired, may be reinforced. The reinforcement is accomplished by adding a reinforcing material such as glass rovings or fabrics to the outer layer element 10 from rolls 14. The thus reinforced element is passed through encapsulating tank 15 wherein the element is encapsulated with an encapsulating resin which may be of the same type as hereinbefore set forth, that is, a thermosetting or thermoplastic resin which possesses a relatively low viscosity, said resin being added to tank 15 through line 16. In tank 15 the element is encapsulated within the resin and after encapsulation is continuously passed to heated die 17. In heated die 17 where the temperature gradient may range from about 100° to about 400° F., the element is formed into the desired shape of the type hereinbefore set forth. After continuously moving through the die the conductive or semi-conductive element in encapsulated form emerges from the outlet end of said die in a cured state and is passed over a cut saw 18 whereby an encapsulated conductive or semi-conductive element is cut to the desired length.

The following example is given as an illustration of the process of the present invention. However, it is to be understood that this example is given merely for purposes of illustration and that the present invention is not necessarily limited thereto.

EXAMPLE

A laminate was prepared by admixing 300 lbs. of a phenolic-formaldehyde resin with a sufficient amount of acetylene black which possessed a resistivity of 1 ohm centimeter and a powder comprising a high surface area inorganic refractory oxide containing at least a monolayer of a carbonaceous pyropolymer, said powder having a resistivity of 10 ohm centimeters were admixed so that the two powders were present in a weight percent of 2% and 3%, respectively. The constituents were admixed for a period of 1 hour at ambient temperature and isopropyl alcohol was added to control the viscosity at 500 cps. At the end of this time the resin mixture was applied to a high absorbing paper which had a thickness of 0.02". The resin was applied by conventional treating conditions in an amount of approximately 60% by weight of the paper. The treated paper was then semi-cured to a B-stage at a temperature of 325° F. for a period of 10 to 15 minutes. Thereafter the two sheets had copper buss bars arranged adjacent to the side portions of said sheet, there being a space of 10" between said bars. The copper foil which acted as the buss bar had a thickness of 0.0017". The sheets were pressured together under a temperature of 360° F. and a pressure of 1000 psi for a period of 60 minutes.

After removing the laminate from the apparatus it was then passed through a mixture of glass rovings and polyester resin whereby the laminate was encapsulated in the mixture. The encapsulated laminate matrix was then pulled through a heated die which possessed a temperature gradient of from 100° to about 400° F. in a continuous manner, and after passage through the die which cured the martix into a sheet, the heating elements were then cut so that each element had a length of 24".

I claim as my invention:

1. A method for the continuous pultrusion of a shaped conductive or semi-conductive element which comprises the steps of:
   (a) admixing at least one conductive or semi-conductive powder possessing a conductivity at ambient temperature of from about $10^{-8}$ to about $10^2$ inverse ohm centimeters with a thermosetting polymeric resin;
   (b) applying said admixture to a support material to form a sheet;
   (c) placing conductive buss bars in juxtaposition between at least two of said sheets to form a conductive or semi-conductive element;
   (d) subjecting said element to a B-stage cure at a temperature in the range of from about ambient to about 400° F. to effect the formation of a semi-cured element;
   (e) reinforcing said element by adding thereto at least one layer of glass rovings;
   (f) encapsulating the reinforced element by passing said element through a bath of encapsulating thermoplastic or thermosetting resin;
   (g) pulling said encapsulated conductive or semi-conductive element through a heated die possessing a temperature gradient within said die of from about 100° to about 400° F. to effect the desired physical shape of said encapsulated conductive or semi-conductive element; and
   (h) recovering said shaped encapsulated conductive or semi-conductive element.

2. The method as set forth in claim 1 in which said conductive powder is acetylene black.

3. The method as set forth in claim 1 in which said semi-conductive powder possessing a conductivity of from $10^{-8}$ to $10^2$ inverse ohm centimeters is a high surface area inorganic oxide containing at least a monolayer of a carbonaceous pyropolymer on the surface thereof.

4. The method as set forth in claim 1 in which said thermosetting resin is a phenolic resin.

5. The method as set forth in claim 1 in which said thermosetting resin is an epoxy resin.

6. The method as set forth in claim 1 in which said conductive buss bar is a copper strip.

7. The method as set forth in claim 1 in which said support material is a paper.

8. The method as set forth in claim 7 in which said paper is a cotton linter paper.

9. The method as set forth in claim 1 in which said support material is a woven fabric.

10. The method as set forth in claim 9 in which said woven fabric is canvas.

11. The method as set forth in claim 1 in which said encapsulating resin is a polyester thermoplastic resin.

12. The method as set forth in claim 1 in which said encapsulating thermosetting resin is an epoxy resin.